United States Patent
Legris et al.

(10) Patent No.: US 10,609,325 B2
(45) Date of Patent: Mar. 31, 2020

(54) REMOVABLE MEMORY CARD WITH SECURITY SYSTEM SUPPORT

(71) Applicant: Ademco Inc., Golden Valley, MN (US)

(72) Inventors: Laurent Legris, Mougins (FR); Olivier Chantelou, Valbonne (FR)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/424,647

(22) Filed: Feb. 3, 2017

(65) Prior Publication Data

US 2017/0230608 A1 Aug. 10, 2017

(30) Foreign Application Priority Data

Feb. 8, 2016 (EP) .................................... 16290030

(51) Int. Cl.
- *H04N 5/77* (2006.01)
- *H04N 5/907* (2006.01)
- *H04N 5/44* (2011.01)
- *G08B 13/196* (2006.01)
- *G06K 19/077* (2006.01)

(Continued)

(52) U.S. Cl.
CPC ....... *H04N 5/772* (2013.01); *G06K 19/07732* (2013.01); *G06K 19/07769* (2013.01); *G08B 13/1966* (2013.01); *G08B 13/19636* (2013.01); *G08B 13/19656* (2013.01); *G08B 13/19669* (2013.01); *H04N 5/38* (2013.01); *H04N 5/44* (2013.01); *H04N 5/907* (2013.01); *H04N 7/183* (2013.01); *G06K 19/0723* (2013.01)

(58) Field of Classification Search
CPC ........ H04N 5/772; H04N 5/907; H04N 7/183; H04N 5/44; H04N 5/38; G08B 13/19656; G08B 13/19669; G08B 13/19636
See application file for complete search history.

(56) References Cited

U.S. PATENT DOCUMENTS

| | | |
|---|---|---|
| 7,580,395 B2 | 8/2009 | Boatwright et al. |
| 7,762,470 B2 | 7/2010 | Finn et al. |

(Continued)

FOREIGN PATENT DOCUMENTS

| | | |
|---|---|---|
| CA | 2813983 A1 | 10/2013 |
| CN | 102 625 019 A | 8/2012 |

(Continued)

OTHER PUBLICATIONS

U.S. Appl. No. 15/233,462, filed Aug. 10, 2016.

(Continued)

*Primary Examiner* — Padma Haliyur
(74) *Attorney, Agent, or Firm* — Husch Blackwell LLP

(57) ABSTRACT

A video camera for use in a security system may include a processor including control circuitry and a removable memory card coupled to the control circuitry. The removable memory card may include a wireless transceiver configured to receive wireless data transmissions from at least one wireless sensor device. The removable memory card may further include security system logic configured to allow the video camera itself to function as a security system, including identifying and then transmitting one or more security system messages to a remote location via the wireless transceiver of the removable memory card.

10 Claims, 4 Drawing Sheets

(51) Int. Cl.
  *H04N 5/38* (2006.01)
  *H04N 7/18* (2006.01)
  *G06K 19/07* (2006.01)

(56) References Cited

U.S. PATENT DOCUMENTS

| | | | |
|---|---|---|---|
| 7,913,073 B2 * | 3/2011 | Choi | G06F 9/4401 |
| | | | 713/1 |
| 8,179,256 B2 | 5/2012 | Crisp et al. | |
| 8,289,161 B2 | 10/2012 | Hosey | |
| 8,810,397 B2 * | 8/2014 | Wieser | G08B 13/08 |
| | | | 340/541 |
| 8,898,750 B2 | 11/2014 | Dattagupta et al. | |
| 9,082,119 B2 | 7/2015 | Ortiz et al. | |
| 2003/0166360 A1 | 9/2003 | Thornton et al. | |
| 2012/0051714 A1 * | 3/2012 | Reimnitz | G08B 13/196 |
| | | | 386/226 |
| 2012/0226827 A1 | 9/2012 | Raju et al. | |
| 2013/0285799 A1 | 10/2013 | Probin et al. | |
| 2014/0279552 A1 | 9/2014 | Ortiz et al. | |
| 2014/0281742 A1 | 9/2014 | Probin | |
| 2014/0313048 A1 | 10/2014 | Sabata et al. | |
| 2014/0320312 A1 | 10/2014 | Sager et al. | |
| 2015/0186879 A1 | 7/2015 | Ortiz et al. | |
| 2016/0012713 A1 | 1/2016 | Siwak et al. | |
| 2016/0093180 A1 | 3/2016 | Fitzgibbon et al. | |

FOREIGN PATENT DOCUMENTS

| | | |
|---|---|---|
| EP | 2639780 A2 | 9/2013 |
| WO | 2007060547 A2 | 5/2007 |
| WO | 2010/027330 A1 | 3/2010 |
| WO | 2014053010 A1 | 4/2014 |

OTHER PUBLICATIONS http://www.eyefi.com/products/mobi-pro, "Mobi Pro. The Ultimate WiFi SD Card," 6 pages, printed Oct. 31, 2015.
https://www.hyperstone.com/Security_en,1176html, "Hyperstone Security Solutions," 1 page, printed Apr. 14, 2017.
Samsung Electronics, "K9XXG08UXM Preliminary Flash Memory," 39 pages, downloaded Apr. 14, 2017.
extended European Search Report from corresponding EP patent application 16290030.2, dated Jul. 22, 2016.
English-language translation of CN patent publication 102 625 019, dated Aug. 1, 2012.

* cited by examiner

REMOVABLE MEMORY CARD WITH SECURITY SYSTEM SUPPORT

The present application claims priority to European Patent Application No. EP 162900300.2, filed on Feb. 8, 2016, entitled "REMOVABLE MEMORY CARD WITH SECURITY SYSTEM SUPPORT", which is incorporated herein by reference.

TECHNICAL FIELD

The disclosure is directed towards security systems, and more particularly to devices and methods for supporting security systems.

BACKGROUND

Security systems are generally known. Such systems are typically used to protect people and assets within secured area such as a home or business from any of a number of threats. For example, a security system may be arranged to detect threats from unauthorized intruders entering the secured area. A security system may also be used to detect environmental threats such as fires, carbon monoxide or natural gas leaks.

In many security systems, a central controller is provided along with a number of remote sensors distributed throughout the secured area. In some cases, fire detectors may be provided in hallways or near combustion sources. Limit switches may be provided on the doors and windows of the secured area. Motion detectors and/or glass break detectors may be provide in other regions of the secured area. Video cameras may also be connected to the central controller.

Such security systems can be relatively expensive to purchase and install. Also, due to the rapid technology advancement, security systems can become obsolete in a relatively short period of time. What would be desirable is an improved security system that can help reduce the cost of owning a security system.

SUMMARY

The disclosure is directed towards security systems, and more particularly to devices and methods for supporting security systems. In one example, a removable memory card is provided for use with a security system sensor such as a digital camera. The removable memory card may include a housing that is configured to be removably accepted by a memory card slot of a security system sensor, such as a digital camera. The removable memory card may further include an electrical connector for connecting the removable memory card to a corresponding electrical connector of the security system sensor when the housing is accepted by the memory card slot of the security system sensor. The removable memory card may further include a nonvolatile memory operatively coupled to the electrical connector. The nonvolatile memory may be configured to record data from the security system sensor, such as digital images, event logs, and/or other security system data. The removable memory card may further include a wireless transceiver for wirelessly communicating with one or more remote devices, and a controller operatively coupled to the wireless transceiver, the nonvolatile memory and the electrical connector. The controller may be configured to identify and then transmit one or more security system messages to a remote location via the wireless transceiver. In some cases, the controller and the wireless transceiver may receive power from the security system sensor via the electrical connector of the removable memory card.

In some instances, the controller of the removable memory card may be programmed with security system logic, some or all of which would be normally provided by a central controller of a traditional security system. For example, in some cases, the controller of the removable memory card may be configured to receive one or more signals from one or more remote security system devices (e.g. sensors) via the wireless transceiver of the removable memory card. If one of the one or more signals correspond to an alarm event, the controller of the removable memory card may identify and transmit one or more security system messages to a remote location via the wireless transceiver of the removable memory card. The remote location may include, for example, a horn in the secured area, a user's phone via a cloud platform, a remote central monitoring station, and/or any other suitable remote location as desired.

In some cases, the controller of the removable memory card may be programmed and/or controlled from a remote location via the wireless transceiver of the removable memory card. For example, the controller may be programmed and/or controlled from a wall mounted control panel that is in operative communication with the controller via the wireless transceiver of the removable memory card. Alternatively, or in addition, the controller may be programmed and/or controlled from a smartphone, a tablet computer, a laptop computer, a desktop computer and/or other device that is in operative communication with the controller via the wireless transceiver of the removable memory card.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
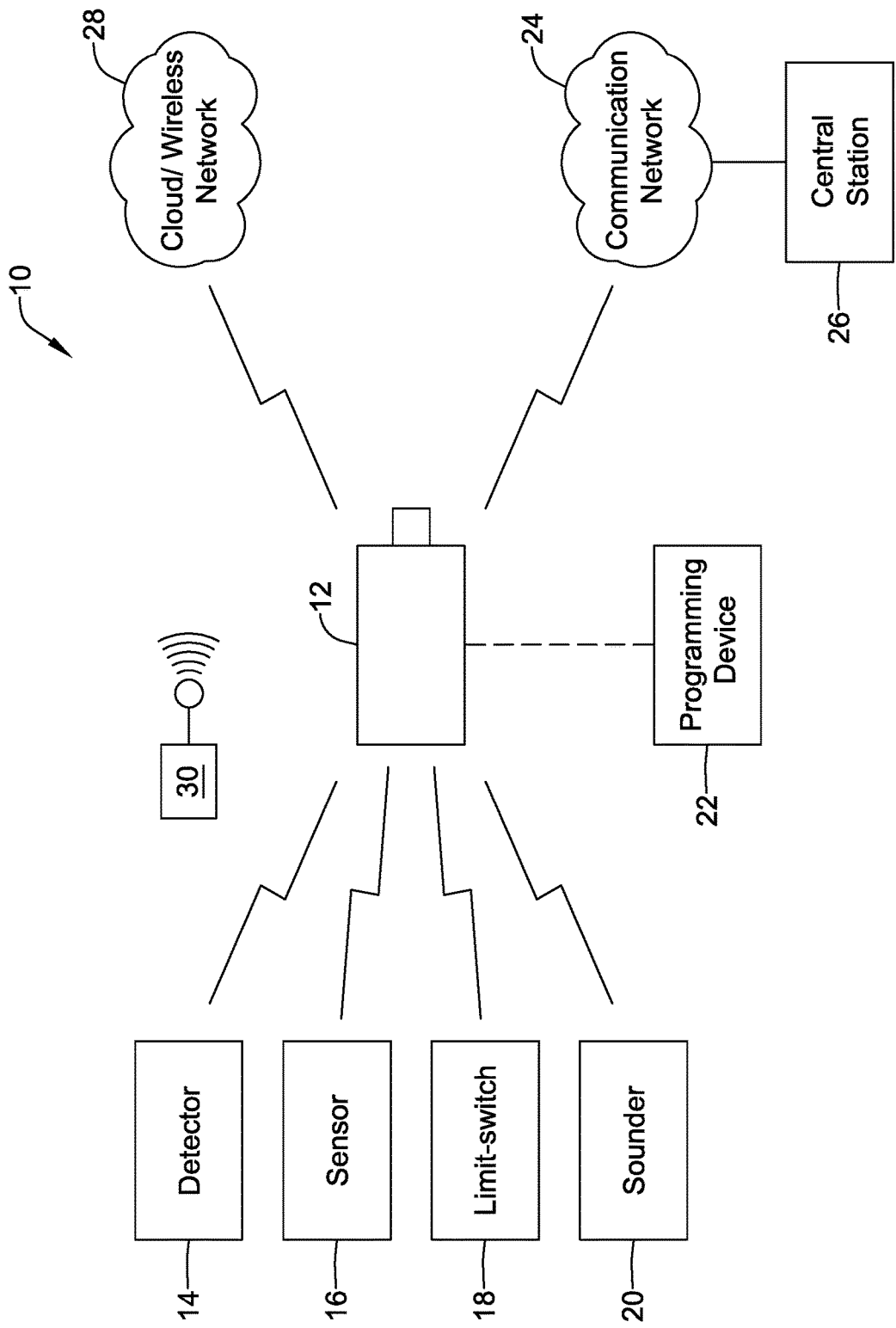
FIG. 1 is a schematic diagram of an illustrative security system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

The disclosure is directed towards security systems, and more particularly to devices and methods for supporting security systems. In one example, a removable memory card is provided for use with a security system sensor or device, such as a digital camera, a motion sensor, a glass break sensor, a smoke sensor, a gas detector, and/or any other suitable security system sensor or device. The removable memory card may include a memory, a wireless transceiver and a controller. The controller of the removable memory card may be programmed with security system logic, some or all of which would be normally provided by a central controller of a traditional security system. For example, in some cases the controller of the removable memory card may be configured to receive one or more signals from one or more remote security system devices (e.g. sensors) via the wireless transceiver of the removable memory card. If one of the one or more signals correspond to an alarm event, the controller of the removable memory card may identify and transmit one or more security system messages to a remote location (i.e. remote from the removable memory card) via the wireless transceiver of the removable memory card. The remote location may include, for example, a horn in the secured area, a user's phone via a cloud platform, a remote central monitoring station, and/or any other suitable remote location as desired. For simplicity, the following description described the use of an illustrative removable memory card in conjunction with a digital camera for use in a security system. However, the scope of this disclosure is not to be limited to this example.

FIG. 1 shows an illustrative security system 10 in which some or all of the security system logic has been incorporated into a video camera 12, reducing or eliminating the need for a traditional security system central controller. As will be discussed in more detail below, the video camera 12 may be provided with security system logic. In some cases, a user may interact with the security system logic through a programming device 22, a wireless network and/or the cloud 28. In some instances, video camera 12 can be pan-tilt-zoom (PTZ) cameras, but this is not required. In some instances, the video camera 12 may be a digital camera and may capture video images and/or still images.

The illustrative security system 10 also includes a number of other devices, such as, but not limited to, one or more detectors 14 (e.g. motion detectors), sensors 16 (e.g. glass break sensors), limit-switches 18, sounders 20, and/or other security or home automation devices. In some cases, detectors 14, sensors 16, and limit-switches 18 and Sounders 20 may be considered security system devices. While not explicitly shown, the security system 10 may include more than one video camera 12, if desired. The devices 14, 16, 18, and 20 can be used to monitor actions in a building. In the example shown, the video camera 12 can wirelessly receive data from one or more of the devices 14, 16, 18 and 20.

In some instances, the one or more devices 14, 16, 18, and 20 may communicate with the video camera 12 using a wireless communication protocol such as, for example, cellular communication, RF6, ZigBee, Bluetooth, Bluetooth® low energy (BLE), Wi-Fi, IrDA, dedicated short range communication (DSRC), EnOcean, or any other suitable wireless protocols, as desired. In some cases, a communications gateway 30 may be provided to facilitate communication between the various security system components 12, 14, 16, 18, and 20 over a local area network (LAN), a wide area network (WAN), and/or the internet. A plurality of sensors can be included within a plurality of devices 14, 16, 18, and 20. These devices may be easily installed by placing them in the desired locations, and they may operate in a wireless manner in conjunction with a central hub, such as video camera 12, in the same manner as if they were interoperating with a central controller of a conventional security system. Each of the devices 14, 16, 18, and 20 may be configured to monitor a condition of the premises and send data signals to the video camera 12 indicative of their status, alarm conditions and the like.

If the video camera 12 determines that there is an event (e.g., alarm event, etc.), the video camera 12 may identify and transmit one or more security system messages to a remote location. In some cases, the security system messages may be transmitted to a local device such as a horn in the building. In other instances, the video camera 12 may transmit the security system messages to, for example, a user's phone via a cloud platform 28, a remote central monitoring station 26, and/or any other suitable location. In some cases, if it is determined that there is an alarm event (e.g., fire, break in, etc.) occurring, a number of contacts (e.g., police, fire department, hospital, etc.) and/or a remote central monitoring station 26 may be contacted through a communications network 24 and informed of details relating to the alarm event (e.g., type of event, address of the event, etc.). In some instances, the remote central monitoring station 26 may be an off-site and/or remote monitoring station contracted by the owners of the security system 10 to monitor the state of the security system 10.

Figure 2:
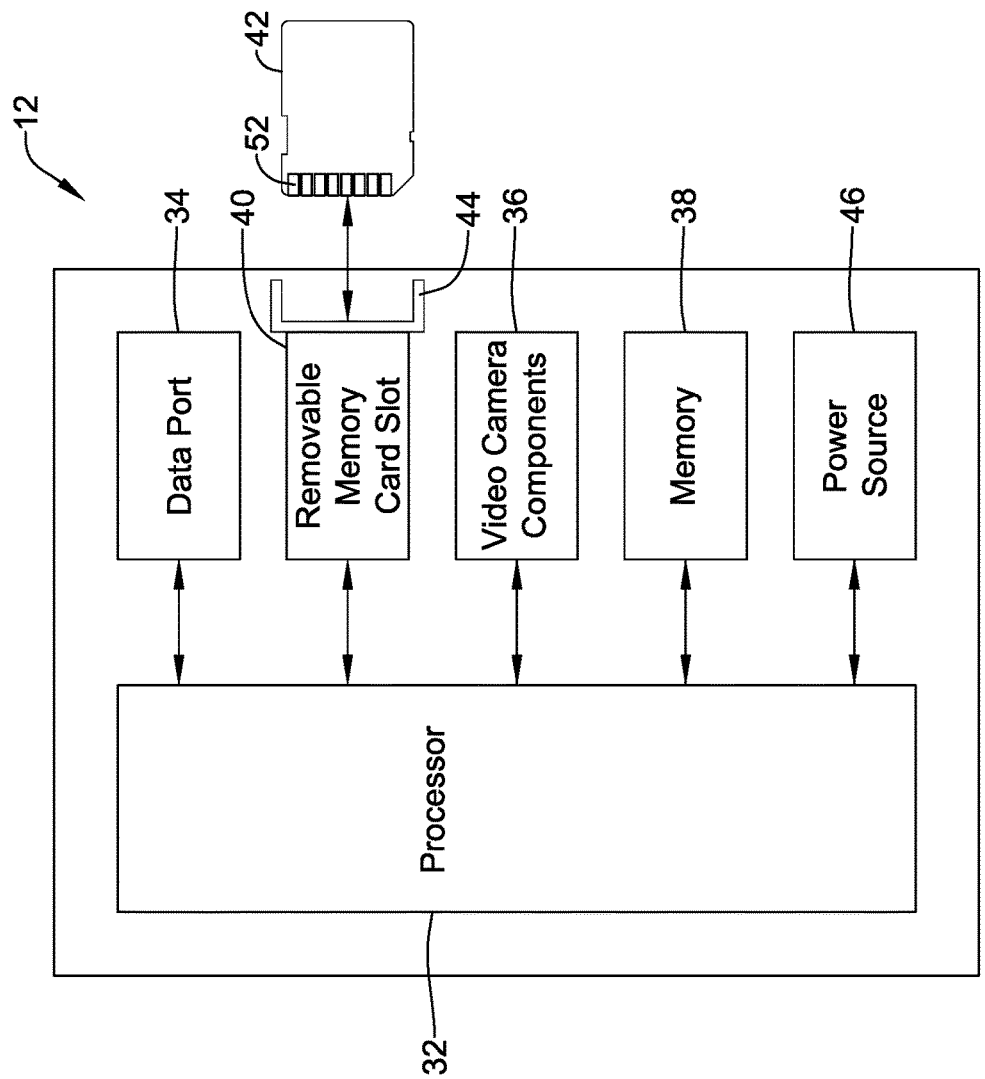
FIG. 2 is a schematic view of an illustrative video camera for use with the illustrative security system of FIG. 1.

FIG. 2 is a schematic view of an illustrative video camera 12 in which the security system logic has been incorporated into the video camera 12. In FIG. 2, video camera 12 includes a processor (e.g. microprocessor, microcontroller, etc.) 32, a data port 34, and an internal memory 38. In some cases, the internal memory 38 may be part of the processor 32.

Figure 3:
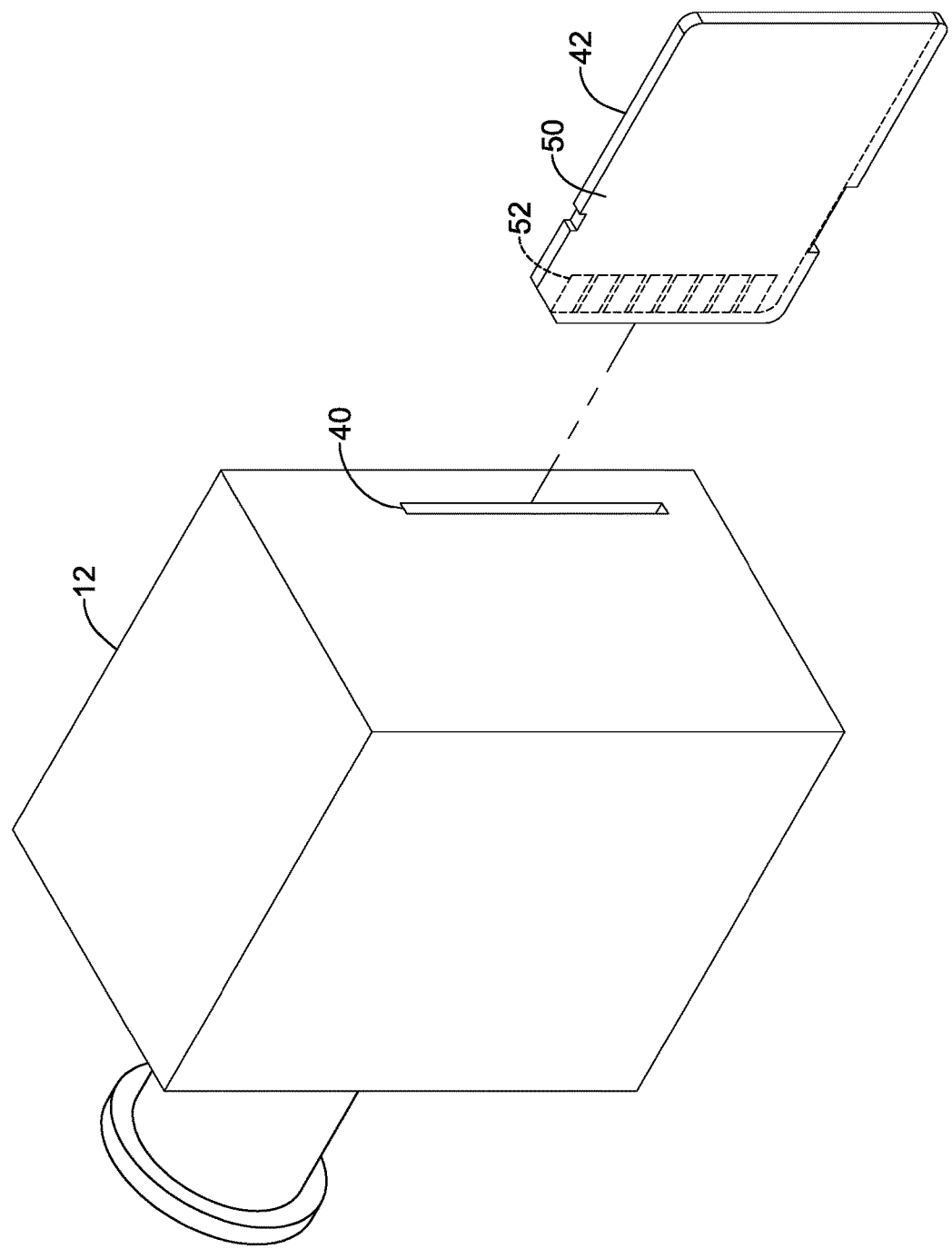
FIG. 3 is a schematic view of an illustrative removable memory card for use with an illustrative video camera.

The video camera 12 housing may include a removable memory card slot 40 for receiving a removable memory card 42, as best shown in FIGS. 2-3. The removable memory card slot 40 may include a connector 44 (see FIG. 2) that receives a corresponding connector 52 of the removable memory card 42 when the removable memory card 42 is inserted into the removable memory card slot 40. This connector 44 may allow the processor 32 to communicate with the removable memory card 42, and in some cases, provide power to the removable memory card 42. In some instances, the removable memory card 42 may be a Secure Digital (SD) memory card, but this is not required. The removable memory card 42 may have a housing that is dimensioned to be removable and/or easily replaceable via a removable memory card slot 40 in the housing of the video camera 12.

Data port 34 of the video camera 12 may be a wireless port such as a Bluetooth™ port or any other wireless protocol. In other cases, data port 34 may be a wired port such as a serial port, a parallel port, a CAT5 port, a USB (universal serial bus) port, and/or the like. In some instances, data port 34 may be a USB port and may be used to download and/or upload information from a USB flash drive or some other data source. In some cases, data port 34 may be configured to communicate with processor 32 and may, if desired, be used to upload information to processor 32, memory 38 and/or removable memory card 42, and/or download information from processor 32, memory 38 and/or removable memory card 42. Information that can be uploaded and/or downloaded may include, for example, values of operating parameters. In some instances, data port 34 may be used to upload and/or modify a previously-created security system configuration into video camera 12, thereby hastening the programming process. In some cases, data port 34 may be used to download a security configuration that has been created using video camera 12, so that the security system configuration may be transferred to other similar security systems, hastening their programming process. In some cases, data port 34 may be used to upload and/or download information pertaining to a security system dealer or contractor, if desired. In some cases, data port 34 may be used to download data stored within the memory 38 of the video camera and/or nonvolatile memory 56 of the removable memory card 42 for analysis. For example, data port 34 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device or network, as desired. In some cases, the data may be convertible to an MS EXCEL®, MS WORD®, text, XNL, and/or Adobe PDF® file, but this is certainly not required.

While not discussed in detail, the video camera 12 may also include the necessary structure and video camera components 36 provided on a typical video camera. The video camera 12 may further include a battery and/or other power source 46 as shown.

In some cases, the processor 32 of the video camera 12 may be programmed with security system logic, some or all of which would be normally provided by a central controller of a traditional security system. For example, in some cases, the processor 32 may be configured to receive one or more signals from one or more remote security system devices 14, 16, 18, and 20 via the data port 34 and/or a wireless transceiver (if present) of the removable memory card 42. If one of the one or more signals correspond to an alarm event, the processor 32 may identify and transmit one or more security system messages to a remote location via the data port 34 and/or a wireless transceiver (if present) of the removable memory card 42. The remote location may include, for example, a horn in the secured area, a user's phone via a cloud platform, a remote central monitoring station, and/or any other suitable remote location as desired. In some cases, software that when executed by the processor 32 implements the security system logic may be initially provided by the removable memory card 42, and may be read up by the processor 32 from the removable memory card 42 for execution.

In some instances, the processor 32 may store video images/data on the removable memory card 42 for later reference. In some cases, the removable memory card 42 may be partitioned into two or more partitions; one for storing executable programs and one for storing video images/data. In some cases, the processor 32 may transmit live video data to a remote location via the data port 34 and/or a wireless transceiver (if present) of the removable memory card 42.

Figure 4:
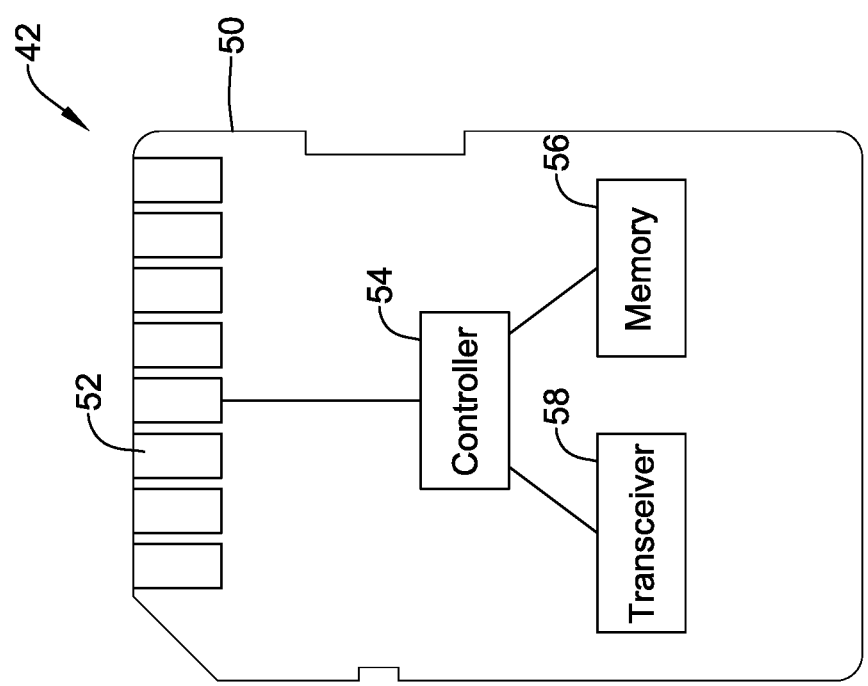
FIG. 4 is a perspective view of an illustrative removable memory card and video camera.

Instead of the processor 32 of the video camera 12 being programmed with the security system logic, it is contemplated that the removable memory card 42 itself may include a controller 54 that is programmed with security system logic. Referring briefly to FIG. 4, the removable memory card 42 may include a housing 50 that has an electrical connector 52. The electrical connector 52 may be configured to connect to the corresponding electrical connector 44 of video camera 12 when the housing 50 of the removable memory card 42 is accepted within the removable memory card slot 40 of the video camera 12, as best shown in FIGS. 2-3. The electrical connector 52 of the removable memory card 42 may be operatively coupled to a controller 54 disposed within the housing 50 of the removable memory card 42. In some cases, the removable memory card 42 may further include a wireless transceiver and/or antenna 58. The wireless transceiver 58 may enable radiofrequency (RF) (wireless) communication capabilities such as, but not limited to, cellular communication, RF6, ZigBee, Bluetooth, Bluetooth® low energy (BLE), Wi-Fi, IrDA, dedicated short range communication (DSRC), EnOcean, or any other suitable wireless protocols, as desired. In one example, the transceiver 58, controller 54 and other necessary components may be incorporated inside of the housing 50 of the removable memory card 42.

During operation, the wireless transceiver 58 of the removable memory card 42 may wirelessly communicate with one or more devices 14, 16, 18, and 20 of a security system 10 and/or one or more other remote devices. This may include receiving one or more signals, such as an alarm event signal, from the one or more wireless devices 14, 16, 18, and 20. In some instances, the controller 54 of the removable memory card 42 may be configured to identify and then transmit one or more security system messages and/or alerts via the wireless transceiver 58 to a remote location such as, but not limited to, a horn in the secured area, a local control panel, a smartphone, a tablet, a remote central monitoring station 26 and/or any other suitable device or location. In some cases, the controller 54 may transmit one or more images captured by the video camera 12 to the remote location via the wireless transceiver 58.

In some cases, the removable memory card 42 may include a nonvolatile memory 56 operatively coupled to the controller 54 and/or electrical connector 52. The nonvolatile memory 56 may include not only security system logic, but in some cases home automation and/or other system logic for controlling other home automation system or sub-systems. The nonvolatile memory 56 of the removable memory card 42 may be used to record digital images from the video camera 12.

In some instances, the controller 54 and/or processor 32 may be configured to continuously capture images and record the images to the nonvolatile memory 56 of the removable memory card 42. The video camera 12 may store the images for a predetermined amount of time (e.g. 1 hour, 2 hours, 6 hours, 24 hours, etc.) before recording newly acquired images over the previously captured images. In other instances, the controller 54 and/or processor 32 may begin to capture and record images to the nonvolatile memory 56 of the removable memory card 42 after a triggering or alarm event is detected. For example, in some instances, the controller 54 and/or processor 32 may be configured to instruct the video camera 12 to being recording digital images to the nonvolatile memory 56 in response to a motion detection signal received from one or more wireless devices 14, 16, 18, and 20. In some cases, the controller 54 of the removable memory card 42 may be configured to instruct the processor 32 of the video camera 12 to being recording digital images in response to a signal received from one or more wireless devices 14, 16, 18, and 20. In some cases, the controller 54 and/or processor 32 may be configured to instruct the video camera 12 to being recording digital images in response to a signal received from the video camera 12 itself (e.g. detected movement in an image). For example, the controller 54 and/or processor 32 may be configured to process one or more signals, such as digital images and/or audio input received from the video camera 12 itself, to identify an alarm event and/or security system message. Power may be supplied to the controller 54 and the wireless transceiver 58 of the removable memory card 42 by the video camera 12 through the connectors 44 and 52.

In some cases, the controller 54 of the removable memory card 42 may be programmed and/or controlled from a remote location via the wireless transceiver 58. For example, the controller 54 may be programmed and/or controlled from a wall mounted control panel that is in operative communication with the controller 54 via the wireless transceiver 58 of the removable memory card 42. Alternatively, or in addition, the controller 54 may be programmed and/or controlled from a smartphone, a tablet computer, a laptop computer, a desktop computer and/or other device that is in operative communication with the controller 54 via the wireless transceiver 58. It is contemplated that the wireless transceiver 58 may be compatible with one or more wireless communication protocols such as, for example, cellular communication, RF6, ZigBee, Bluetooth, Bluetooth® low energy (BLE), Wi-Fi, IrDA, dedicated short range communication (DSRC), EnOcean, or any other suitable wireless protocols, as desired.

In some instances, the controller 54 and/or the nonvolatile memory 56 of the removable memory card 42 may be programmed through a secure web page or through an application specifically designed for the removable memory card 42. For example, removable memory card 42 may be configured and/or customized by connecting the removable memory card 42 via a wired or wireless connection to a programming device 22 (see FIG. 1), and then executing a configuration program on the programming device 22. In other instances, the removable memory card 42 may be wireless connected to a gateway and may operatively communicate with a security system application program operating in the cloud 28. The security system application program can then be accessed and/or controlled via the cloud 28 using a personal computer, smart phone, tablet, etc. In response, the security system application program may provide control instructions to the controller 54 of the removable memory card 42. The security system application program may also be used by a user to view information regarding the operation and/or configuration of the security system 10. For example, a user may be able to view through the security system application program live video data, recorded video data, current status, recent alerts, alarm histories, system faults, synced sensors, active sensors, and/or other information.

In some cases, the wireless transceiver 58 of the removable memory card 42 may support multiple communication protocols. For example, wireless transceiver 58 may support WiFi and Bluetooth® communication protocols. In some cases, the WiFi protocol may be used to communicate with the wireless devices 14, 16, 18, and 20, and the Bluetooth® protocol may be used to communicate with a user's smart phone or tablet. In some cases, the security system 10 may be activated and deactivated (armed and disarmed) through the Bluetooth® or BLE equipped smart phone or tablet. In some cases, the security system 10 may be activated and deactivated (armed and disarmed) through a WiFi equipped smart phone, tablet, gateway or the like. These are just some examples.

The configuration of the removable memory card 42 may include registering the various devices 14, 16, 18, and 20 with the video camera 12 so that the video camera 12 will communicate only with the desired registered devices. It may also include exit delay times, entry delay times, as well as IP addresses for alarm reporting. Once entered, these (and other) configuration parameters may be stored in the nonvolatile memory 56 of the removable memory card 42 so that if the video camera 12 is powered down or replaced, the configuration data is maintained and loaded when the video camera 12 is powered back on.

It is contemplated that providing the security system logic on the removable memory card 42, rather than in the memory 38 of the video camera 12, may allow for the security system 10 to be more easily upgraded or replaced as technologies change and/or advance. For example, as advancements in the video camera components 36 progress, the user may want to upgrade to the video camera 12 to an upgraded video camera 12. The user need only remove the removable memory card 42 from the old video camera 12 and slide in the removable memory card 42 into the upgraded video camera 12. Configuration information and functionality may then be restored with minimal effort, and those parts of the security system that are not obsolete (e.g. the removable memory card 42) need not be replaced. Moreover, providing the security system logic on the removable memory card 42 may reduce or eliminate the need for a wall mounted control panel, since the video camera 12 itself may function as the control panel/hub for the security system 10 in lieu of a traditional wall mounted control panel.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A removable memory card for use with a digital camera, the removable memory card comprising:
   a housing configured to be removably accepted by a memory card slot of the digital camera;
   a first electrical connector for connecting the removable memory card to a corresponding electrical connector of the digital camera when the housing is accepted by the memory card slot;
   a wireless transceiver for wirelessly communicating with one or more remote security system devices;
   a nonvolatile memory operatively coupled to the first electrical connector; and
   a controller operatively coupled to the wireless transceiver, the nonvolatile memory, and the first electrical connector,
   wherein the controller is configured to instruct the digital camera to continuously capture and record digital images to the nonvolatile memory,
   wherein the controller is configured to process the digital images,
   wherein, when the digital images are indicative of an alarm event, the controller is configured to identify and transmit a security system message or one or more of the digital images to a remote location via the wireless transceiver, and
   wherein the controller and the wireless transceiver are configured to receive power from the digital camera via the first electrical connector.

2. The removable memory card of claim 1, wherein, while recording the digital images, the controller is configured to receive a device signal from the one or more remote security system devices via the wireless transceiver, and wherein, when the device signal is indicative of the alarm event, the controller is configured to identify and transmit the security system message or the one or more of the digital images to the remote location via the wireless transceiver.

3. The removable memory card of claim 1, wherein the memory card slot comprises an SD memory card slot.

4. The removable memory card of claim 1, wherein the wireless transceiver comprises a Bluetooth transceiver.

5. The removable memory card of claim 1, wherein the wireless transceiver comprises a Wifi transceiver.

6. A removable memory card for use with a digital camera, the removable memory card comprising:
  a housing configured to be removably accepted by a memory card slot of the digital camera;
  a first electrical connector for connecting the removable memory card to a corresponding electrical connector of the digital camera when the housing is accepted by the memory card slot;
  a wireless transceiver for wirelessly communicating with one or more remote security system devices;
  a nonvolatile memory operatively coupled to the first electrical connector and configured to store an application program in a non-transitory state; and
  a controller operatively coupled to the wireless transceiver and the nonvolatile memory and configured to execute the application program,
  wherein the application program is configured to cause the controller to instruct the digital camera to continuously capture and record digital images to the nonvolatile memory,
  wherein the application program is configured to cause the controller to process the digital images,
  wherein, when the digital images are indicative of an alarm event, the application program is configured to cause the controller to identify and transmit a security system message or one or more of the digital images to a remote location via the wireless transceiver, and
  wherein the controller and the wireless transceiver are configured to receive power from the digital camera via the first electrical connector.

7. The removable memory card of claim 6, wherein, while recording the digital images, the controller is configured to receive a device signal from the one or more remote security system devices via the wireless transceiver, and wherein, when the device signal is indicative of the alarm event, the controller is configured to identify and transmit the security system message or the one or more of the digital images to the remote location via the wireless transceiver.

8. A video camera for use in a security system, the video camera comprising:
  a housing;
  a removable memory card; and
  a memory card slot accessible from outside of the housing for receiving the removable memory card,
  wherein the removable memory card comprises:
    a first electrical connector for connecting the removable memory card to a corresponding electrical connector of the memory card slot;
    a wireless transceiver for wirelessly communicating with one or more remote security system devices;
    a nonvolatile memory operatively coupled to the first electrical connector; and
    a controller operatively coupled to the wireless transceiver, the nonvolatile memory, and the first electrical connector,
    wherein the controller is configured to instruct the video camera to continuously capture and record digital images to the nonvolatile memory,
    wherein the controller is configured to process the digital images,
    wherein, when the digital images are indicative of an alarm event, the controller is configured to identify and transmit a security system message or one or more of the digital images to a remote location via the wireless transceiver, and
    wherein the controller and the wireless transceiver are configured to receive power from the video camera via the first electrical connector.

9. The video camera of claim 8, wherein the memory card slot comprises an SD memory card slot, and wherein the wireless transceiver comprises one or more of a Bluetooth transceiver and a Wifi transceiver.

10. The video camera of claim 8, wherein, while recording the digital images, the controller is configured to receive a device signal from the one or more remote security system devices via the wireless transceiver, and wherein, when the device signal is indicative of the alarm event, the controller is configured to identify and transmit the security system message or the one or more of the digital images to the remote location via the wireless transceiver.

* * * * *